United States Patent [19]

Fischer

[11] Patent Number: 5,096,344
[45] Date of Patent: Mar. 17, 1992

[54] DRILL BIT HAVING BLUB-LIKE SHANK ENLARGEMENTS TO REDUCE JAMMING

[75] Inventor: Artur Fischer, Waldachtal 3/Tumlingen, Fed. Rep. of Germany

[73] Assignee: fischerwerke Artur Fischer GmbH & Co., KG, Tumlingen, Fed. Rep. of Germany

[21] Appl. No.: 736,383

[22] Filed: Jul. 26, 1991

[30] Foreign Application Priority Data

Aug. 6, 1990 [DE] Fed. Rep. of Germany ....... 4024889
Sep. 6, 1990 [DE] Fed. Rep. of Germany ....... 4028261

[51] Int. Cl.$^5$ .............................................. B23B 51/02
[52] U.S. Cl. .................................. 408/230; 175/323; 175/394
[58] Field of Search .................. 408/227, 229, 230; 175/323, 394, 395

[56] References Cited

U.S. PATENT DOCUMENTS 4,080,093  3/1978  Maier ................... 408/230

FOREIGN PATENT DOCUMENTS 3014388 10/1981 Fed. Rep. of Germany ........ 408/81
3828982  3/1990 Fed. Rep. of Germany .

*Primary Examiner*—Daniel W. Howell
*Attorney, Agent, or Firm*—Michael J. Striker

[57] ABSTRACT

The drill bit for producing a cylindrical drilled hole, especially in concrete, has a shank and a drilling head at one end of the shank provided with at least one helically extending drilling dust groove. At least two bulb-like shank enlargements (6,7) are provided on the shank (5) arranged in succession axially. Each of the shank enlargements (6,7) has the same maximum diameter and the drilling head has a drilling head diameter which is at least as great as the maximum diameter of the shank enlargements (6,7). Advantageously two drilling dust grooves with semicircular cross sections are provided on the shank displaced from each other radially by about 180° to form a cross member with cutting edges on the drilling dust grooves.

9 Claims, 2 Drawing Sheets

DRILL BIT HAVING BLUB-LIKE SHANK ENLARGEMENTS TO REDUCE JAMMING

BACKGROUND OF THE INVENTION invention relates to a drill bit for producing cylindrical drilled holes, particularly in concrete.

A drill bit for concrete is known having a drilling head and a straight shank with at least one helically extending drilling dust groove. The end of the shank remote from the drilling head is structured for clamping in a drill bit chuck of a drilling machine or similar device.

If a drilled hole is to be made in concrete using a drill bit of this type, then in the case of comparatively deep drilled holes, the drill bit goes out of alignment and jamming occurs during the drilling process. The aggregates contained in concrete render the concrete masonry nonhomogeneous, and, for this reason, the drill bit tip is displaced laterally when it meets a particularly hard aggregate, which forces the drill bit away from the axis of the drilled hole. This leads to jamming and thus to a considerable strain on the drill bit. The hand-operated drilling machine then executes jerky movements, which put a strain on the operator, particularly the operator's wrists.

SUMMARY OF THE INVENTION

It is an object of the present invention to provide a drill bit for making cylindrical drilled holes, particularly in concrete, which has a good guidance in the straight-on direction and which to a large extent avoids the risk of jamming during drilling operation.

This object and others which will become more apparent hereinafter are attained in a drill bit having a drilling head and a straight shank with at least one helically extending drilling dust groove. The end of the shank remote from the drilling head is structured for clamping in a drill bit chuck of a drilling machine or similar device.

According to the invention, the shank is provided with at least two bulb-like shank enlargements arranged in succession axially. Each of the shank enlargements has a maximum diameter, which is the same for each enlargement, and the drilling head is at least the same size as the maximum diameter of the shank enlargements.

Because of the bulb-like shank enlargements arranged in succession on the drill shank, the maximum diameter of which enlargements corresponds approximately to the drilling head diameter, a very accurate guidance of the drill bit in straight-on operation during drilling is achieved. First, the drilling head penetrates the masonry until the first bulb-like shank enlargement enters the drilled hole at the mouth of the drill hole and takes over guidance of the drill bit in a straight-on direction. If the drill bit penetrates far enough for the second bulb-like shank enlargement to enter the drilled hole also, then guidance of the drill shank in the straight-on direction is thereby further assisted and risk of the drill bit going out of alignment and becoming jammed in the drilled hole is virtually completely eliminated.

The angle at which the drilling dust grooves run relative to a line perpendicular to the shank axis is preferably more than 45°, so that, when the drilling dust grooves are sufficiently deep, the accumulating drilling dust is carried rapidly out of the drilled hole.

It is especially advantageous for the cross members between the drilling dust grooves or portions of a drilling dust groove to be wider than the drilling dust grooves, since the comparatively wide cross members provide good contact surfaces on the bulb-like shank enlargements. These relatively wide cross members and contact surfaces are able to support themselves well against the wall of the drilled hole, when lateral forces occur, without becoming jammed in the process. The preferred embodiment provides for the cross member between the drilling dust grooves to be more than 1.5 times wider than the drilling dust grooves. In concrete in particular, an optimum guidance for the drill bit is achieved in this manner.

Between two bulb-like shank enlargements that adjoin each other directly, an annular groove may encircle the shank. In addition, it is advantageous for the transitional regions from the drilling dust grooves to the cross members between them to be provided with cutting edges, since these cutting edges bring about a smoothing of the wall of the drilled hole.

The curvature of the bulb-like enlargements has a relatively large radius of curvature, i.e., as in a chord. This shallow curvature does not prevent the drill bit from penetrating the masonry during the drilling process, but reduces the friction of the shank in the drilled hole. The shank contacts the wall of the drilled hole only in the apex regions of the bulb-like enlargements. As the depth of the drilled hole increases, the guidance of the drill bit in the straight-on direction as further shank enlargements enter the drilled hole is reinforced.

A very advantageous discharge of drilling dust is attained, if the drill shank is provided with two helically extending drilling dust grooves displaced radially from each other, preferably by about 180°, an end portion of each of which runs out along a side edge of the drilling plate. For the drilling dust accumulating on each side of the drilling plate there is thus a separate drilling dust groove available. In the case of known hammer drills, the drill shank is provided with only one drilling dust groove, which extends in the region of the drilling head along a side edge of the drilling plate.

When only one drilling dust groove is present, the mouth of the groove arranged on the other side of the drilling plate opens directly behind the drilling head also into this drilling dust groove, so that at this opening point the discharge of the drilling dust may cause troublesome blockages. Furthermore, because of the asymmetrical opening of the drilling dust groove in the region of the drilling head, drill shank guide surfaces of different size that are staggered with respect to the side edges of the drilling plate occur, which may cause the drill bit to run off center. An arrangement of two helically running drilling dust grooves, and thus a symmetrical opening of the grooves eliminates those disadvantages.

It is especially advantageous for each of the drilling dust grooves to have a semicircular cross-section. This produces between the drilling dust groove and the outer cylindrical surface of the drill shank an approximately right-angled transition, which forms a sharp edge reaming out the drilled hole. Moreover, this configuration hinders drilling dust from getting between the cross member surface of the drill shank and the wall of the drilled hole. Drilling dust that penetrates can lead to the drill bit becoming jammed in the drilled hole and thus to generation of heat, which is damaging to the drill bit.

BRIEF DESCRIPTION OF THE DRAWING

The objects, features and advantages of the present invention will now be illustrated in more detail by the following detailed description, reference being made to the accompanying drawing in which.

DETAILED DESCRIPTION OF THE INVENTION

Figure 1:
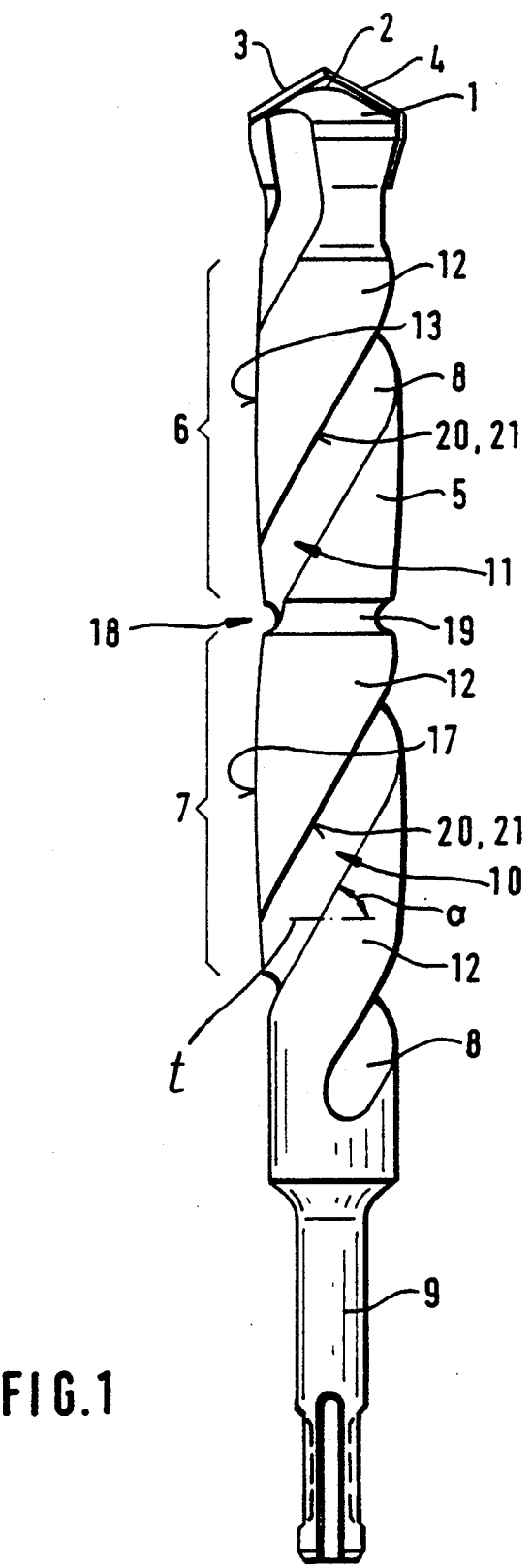
FIG. 1 is a schematic side elevational view of a drill bit according to the invention.

FIG. 1 shows a drill bit with a drilling head 1, from which a drilling plate 2 projects with its cutting edges 3,4. There are two bulb-like drill shank enlargements 6,7 arranged in succession axially on the drill shank 5. A drilling dust groove 8 extends along the drill shank 5 to the drilling head 1. At the end of the shank 9 remote from the drilling head the drill bit is structured to be clamped in a drill bit chuck, not illustrated here, of a drilling apparatus. Of course, the form of this end of the shank 9 depends on the structure of the drilling apparatus.

Each of the two bulb-like drill shank enlargements 6,7 has a uniform curvature with a comparatively large radius of curvature, so that this could be called a gradually rising curvature.

There is a cross member 12, the width of which is substantially larger than that of the drilling dust groove 8, between adjacent turns or portions 10,11 of the drilling dust groove 8. The comparatively wide cross member 12 provides contact surfaces 13, 17 precisely in a peak region of the shank enlargements 6,7, which act as guide faces as the drill bit penetrates the masonry.

An annular groove 19 encircles the shank 5 at the shank constriction 18 formed between the two shank enlargements 6,7.

The embodiment shows two shank enlargements 6,7, but with a suitable length of drill shank more than two shank enlargements are possible to achieve a good guidance for the entire length of the drill shank, when making drilled holes of considerable depth. One drilling dust groove 8, or two opposing drilling dust grooves, can then be formed helically on the shank, the transition regions 20 from the drilling dust grooves to the cross member 12 occurring at helical cutting edges 21. These cutting edges 21 smooth the wall of the drilled hole during the drilling operation and thus likewise ensure that the drill bit does not become jammed in the drilled hole.

The drilling dust groove 8 runs at an angle of about 60° relative to a line t shown in the embodiment illustrated in FIG. 1.

Figure 2:
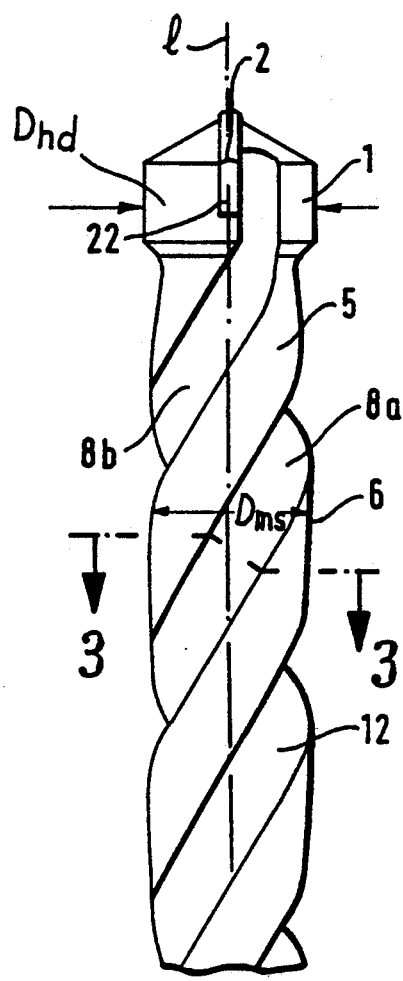
FIG. 2 is a schematic side elevational view of another embodiment of a drill bit according to the invention having two helically extending drilling dust grooves.

The drill shank 5 of the drill bit shown in FIG. 2 is provided with two helically extending drilling dust grooves 8a,8b. These drilling dust grooves 8a,8b, which are arranged displaced radially through 180° with respect to each other, extend in a region of the drilling head 1 parallel to the longitudinal axis 1 in each case along a side edge 22 of the drilling plate 2. The drilling dust accumulating on each side of the drilling plate 2 bisecting the drilling head 1 is thus carried towards the shank end 9 in the drilling dust groove associated with that side.

Figure 3:
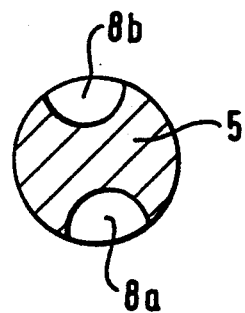
FIG. 3 is a cross-sectional view through the drill shank of the drill bit shown in FIG. 2 taken along the section line 3—3 of FIG. 2.

The semicircular cross-section of the drilling dust grooves 8a,8b seen in FIG. 3 provides for an especially advantageous discharge of drilling dust.

FIG. 2 shows that the diameter $D_{hd}$ of drilling head 1 is somewhat larger than the diameter $D_{ms}$ of the shank enlargements 6,7.

While the invention has been illustrated and described as embodied in a drill bit having bulb-like shank enlargements to reduce jamming, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims.

I claim:

1. In a drill bit for producing a cylindrical drilled hole, especially in concrete, said drill bit having a shank and a drilling head at one end of the shank, and said drill bit being provided with at least one helically extending drilling dust groove, said shank being structure at another end remote from the drilling head for clamping in a drill bit chuck of a drilling machine, the improvement comprising at least two bulb-like shank enlargements (6,7) provided on the shank (5), said shank enlargements (6,7) being arranged in succession axially, and wherein each of said shank enlargements (6,7) has a maximum diameter $(D_{ms})$ and the maximum diameter of each of said shank enlargements (6,7) is the same, and wherein the drilling head (1) has a drilling head diameter $(D_{dh})$ which is at least as great as the maximum diameter of the shank enlargements (6,7).

2. The improvement as defined in claim 2, wherein each of said drilling dust grooves extends on said shank at an angle $\alpha$ as measured from a line (t) perpendicular to the shank, and the angle $\alpha$ is more than 45°.

3. The improvement as defined in claim 1, wherein each of said at least one drilling dust grooves has a width which is smaller than a width of a cross member formed between portions of said at least one drilling dust groove(12).

4. The improvement as defined in claim 3, wherein the cross member (12) is more than 1.5 times wider than the drilling dust groove.

5. The improvement as defined in claim 1, wherein said shank is provided with a circumferential annular groove (19) in the vicinity of a shank constriction (18) formed between the shank enlargements (6,7).

6. The improvement as defined in claim 3, wherein the cross member (12) is provided with cutting edges (21) at the drilling dust grooves (10,11).

7. The improvement as defined in claim 1, wherein two of the drilling dust grooves (10,11) are provided on the shank (5) displaced from each other radially.

8. The improvement as defined in claim 7, wherein the shank has a longitudinal axis (l) and the drilling head (1) has a drilling plate (2) bisecting the drilling head (1), and an end portion of each of the drilling dust grooves (8a,8b) extends parallel to the longitudinal axis (1) of the shank (5) along a side edge (22) of the drilling plate (2).

9. The improvement as defined in claim 1, wherein each of the drilling dust grooves has a semicircular cross-section.

* * * * *